United States Patent [19]

Lane et al.

[11] 4,074,277

[45] Feb. 14, 1978

[54] APPARATUS FOR ACOUSTICALLY SYNCHRONIZING DROP FORMATION IN AN INK JET ARRAY

[75] Inventors: Ramon Lane, Crompond; Howard Hyman Taub, Mount Kisco, both of N.Y.

[73] Assignee: International Business Machines Corporation, Armonk, N.Y.

[21] Appl. No.: 738,423

[22] Filed: Nov. 3, 1976

[51] Int. Cl.$^2$ ............................................. G01D 15/18
[52] U.S. Cl. ...................................................... 346/75
[58] Field of Search ...................................... 346/1, 75

[56] References Cited

U.S. PATENT DOCUMENTS

| | | | |
|---|---|---|---|
| 3,683,396 | 8/1972 | Keur et al. | 346/75 X |
| 3,949,410 | 4/1976 | Bassous et al. | 346/75 |
| 3,984,843 | 10/1976 | Kuhn | 346/75 |
| 4,005,435 | 1/1977 | Lundquist et al. | 346/1 |

Primary Examiner—George H. Miller, Jr.
Attorney, Agent, or Firm—Jack M. Arnold

[57] ABSTRACT

An ink jet synchronization scheme, wherein the drop formation of respective streams in an ink jet array are synchronized acoustically by individual acoustic fiber inputs to each of the streams. The acoustic fibers are attached to grooves adjacent each of the nozzles, with acoustic isolation being provided between the fiber and the nozzle substrate to prevent direct excitation of the substrate. This prevents the occurrence of resonance within the nozzle plate. Alternatively, acoustic isolation is achieved by mounting the synchronization structure separate from the nozzle plate. For example, the acoustic fibers are attached to the charge electrode structure, or are attached to a support structure intermediate the nozzle plate and the charge electrode structure. The acoustic energy inputs to the fibers are independently controlled as is required for certain printing schemes or are made identical as is normally the case.

8 Claims, 14 Drawing Figures

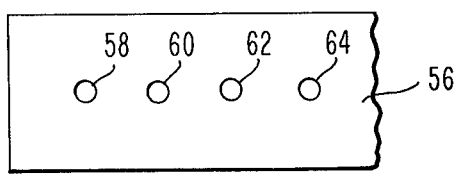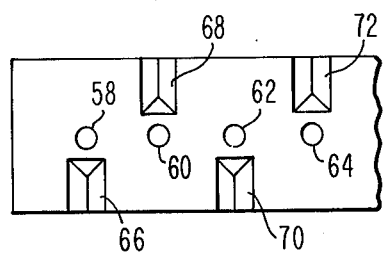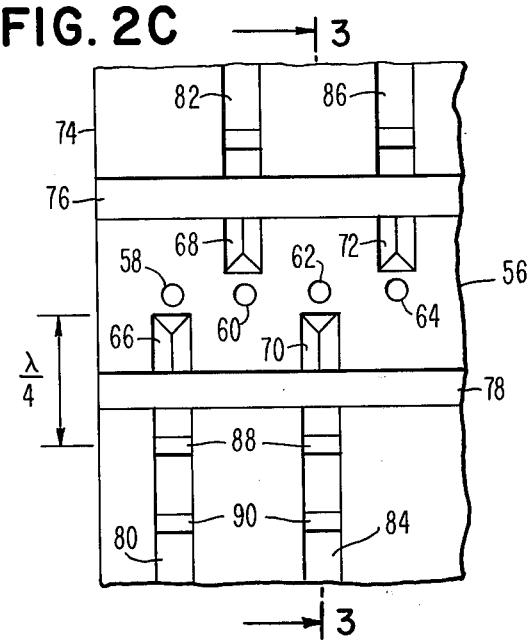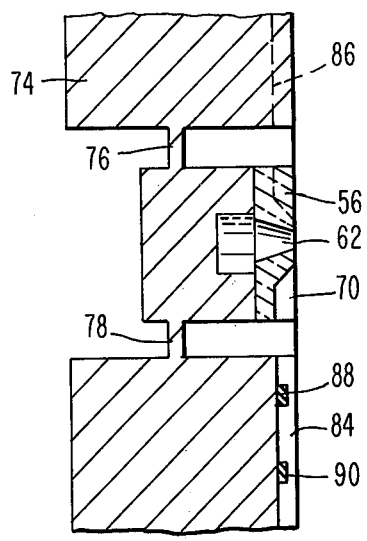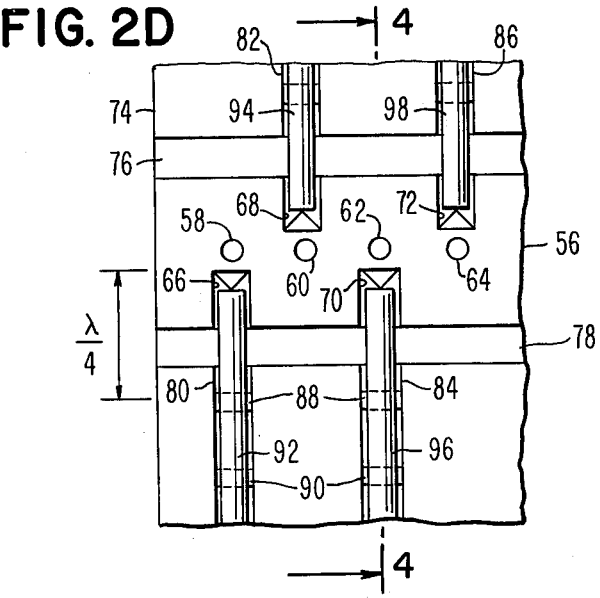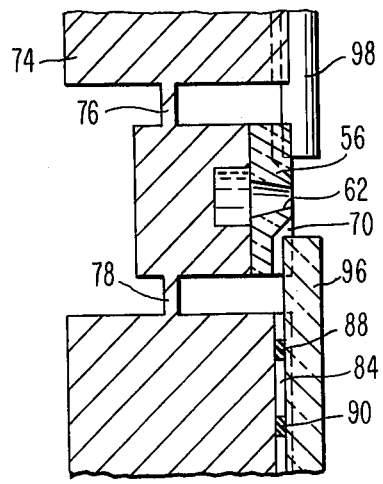

APPARATUS FOR ACOUSTICALLY SYNCHRONIZING DROP FORMATION IN AN INK JET ARRAY

CROSS-REFERENCE TO RELATED APPLICATIONS

Reference is made to U.S. Pat. No. 3,921,916 filed Dec. 31, 1974 on behalf of Ernest Bassous, and entitled "Nozzles Formed in Monocrystalline Silicon;" U.S. Pat. No. 3,984,843 filed Aug. 26, 1975 on behalf of Lawrence Kuhn and entitled "Recording Apparatus Having a Semiconductor Charge Electrode;" and U.S. patent application Ser. No. 543,600 filed Jan. 23, 1975 on behalf of Ernest Bassous et al and entitled "Ink Jet Nozzle." Each of the above referenced U.S. patents and patent application are assigned to the assignee of the present invention.

BACKGROUND OF THE INVENTION

In multinozzle ink jet arrays, it is difficult to achieve uniform excitation, and accordingly uniform drop break-off, that is uniform droplet formation, from one stream to the next. Uniform droplet break-off is required if one is to achieve high quality printing.

The reason uniform excitation is difficult to achieve is because of structural resonance in the piezoelectric driver and ink jet head, that is the fluid cavity, nozzle plate, etc. The difficulty increases in proportion to the number of nozzles in the array.

One possible means to overcome the above described difficulty is to apply excitation directly to the individual ink jets, thus bypassing the structural resonances. A system that does so is illustrated in U.S. Pat. No. 3,949,410 to Bassous et al entitled, "Jet Nozzle Structure For Electrohydrodynamic Droplet Formation and Ink Jet Printing System Therewith," which patent is assigned to the assignee of the present invention. The referenced patent teaches the use of separate electrodes which apply a localized force to each jet for exciting same to cause droplet formation. A critical factor in such a system is that the voltage used to provide the localized force may produce an electric field which results in a potential greater than the break down potential of the dielectric utilized in the ink jet printing system.

According to the present invention, each individual ink jet stream in an array is separately acoustically excited by means of acoustic fiber inputs coupling to the respective streams to produce synchronization of droplet formation from one stream to the next. Hence, since no electric field is produced adjacent the stream, the problem of dielectric break down is obviated.

U.S. Pat. No. 3,380,584 to Fulwyler discloses a particle separator wherein pulses for forming the droplets are applied directly to the fluid reservoir, prior to the emission of an ink jet stream, to avoid vibration of the nozzle. The drop generation is accomplished by acoustic insulation between the nozzle and an acoustic coupler attached to the ink jet head. The acoustic coupler is driven by an electrically driven vibrator. The Fulwyler reference, however, does not disclose the use of individual acoustic energy coupling to the individual streams subsequent to, rather than prior to as taught by Fulwyler, their being emitted from an ink jet head from synchronization purposes between the respective streams in an ink jet array printing system.

SUMMARY OF THE INVENTION

According to the present invention, method and apparatus is disclosed for synchronizing droplet formation in an ink jet array. A plurality of streams of ink are emitted from an ink jet head. Means are included for acoustically exciting each individual one of said streams for synchronizing the droplet formation from one stream to the next.

BRIEF DESCRIPTION OF THE DRAWINGS

FIGS. 2A–2D are sequential views illustrating how acoustic fibers are attached to an ink jet nozzle plate;

FIG. 3 is a cross sectional view of an ink jet head taken along the lines 3—3 of FIG. 2C;

FIG. 4 is a sectional view of an ink jet set taken along fibers lines 4—4 of FIG. 2D;

DETAILED DESCRIPTION OF THE INVENTION

Figure 1:
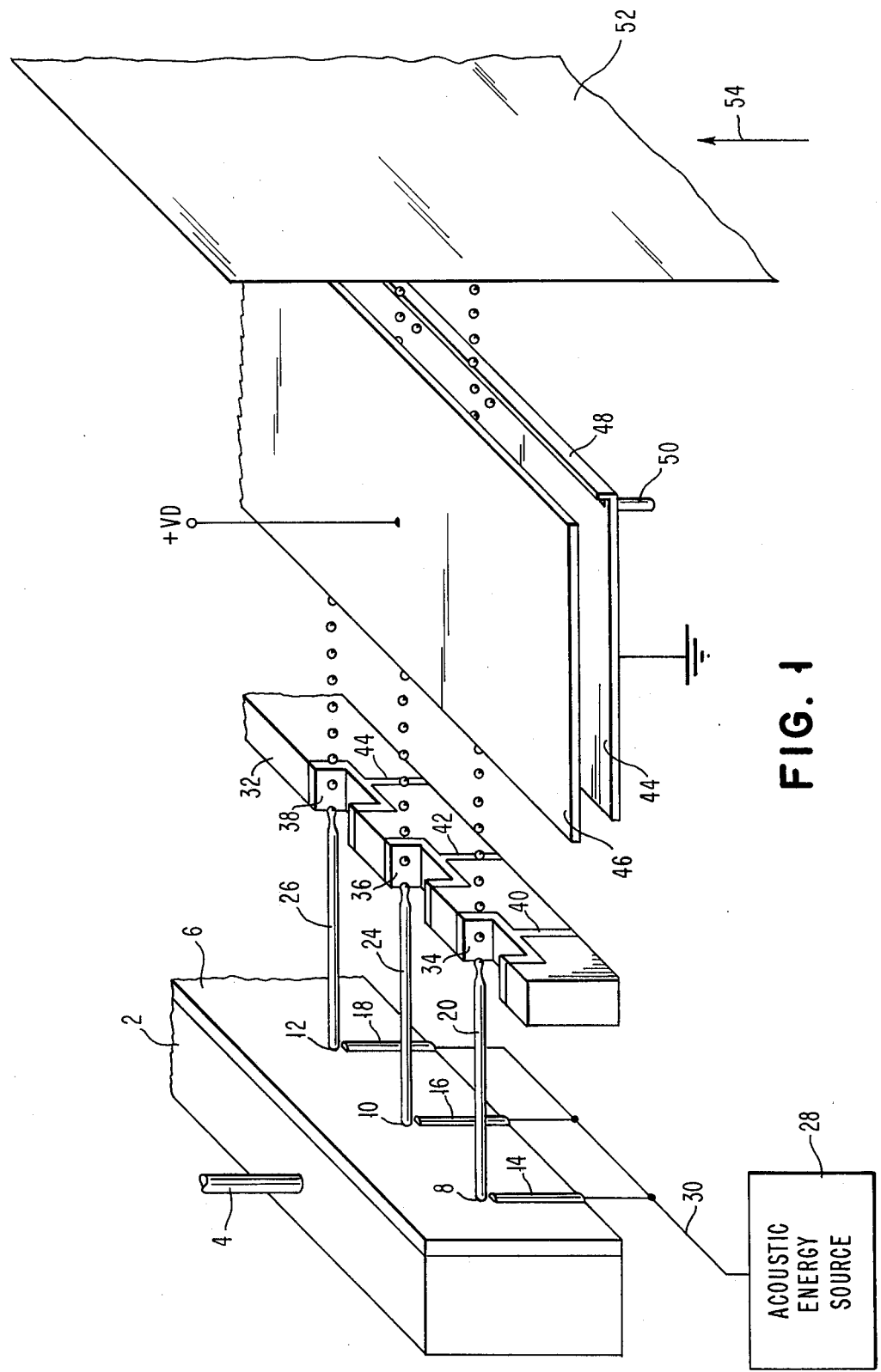
FIG. 1 is a schematic diagram representation of an ink jet recording system utilizing a synchronization scheme according to the present invention.

Referring to FIG. 1, there is shown an ink manifold 2 to which ink is applied via conduit 4 from a reservoir (not shown). A nozzle plate 6 is mounted on the front of the manifold 2, and has a plurality of nozzles formed therein, with nozzles 8, 10 and 12 being illustrated. Acoustic fibers 14, 16 and 18 are mounted on, and accoustically isolated from, the front face of the nozzle plate 6 for applying acoustic energy to ink jet streams 20, 24 and 26, which emanate from the nozzles 8, 10 and 12, respectively. The term acoustic fiber is used generically to include all acoustic coupling means including, but not limited to, acoustic fibers, and acoustic tubing such as glass and plastic. Acoustic energy is supplied from an acoustic energy source 28, for example a piezoelectric transducer, to a line 30 for applying acoustic energy at a frequency on the order of 80 kilohertz (KHZ) to the fibres 14, 16 and 18. The acoustic energy source 28 is illustrated external to the nozzle plate 6, however it is to be appreciated that the acoustic energy source could be formed on the nozzle plate 6. Alternatively, separate acoustic energy sources may be used for each of the respective acoustic fiber inputs, with associated synchronization means being used to separately tune the acoustic inputs for acoustically exciting the respective ink jet streams at a selected perturbation frequency for controlling when the streams break up to form droplets in a charge electrode assembly 32.

The charge electrode assembly 32 is a standard device in which slots 34, 36 and 38 are formed, with the slots being metallized on the interior thereof and being in electrical contact with conductors 40, 42 and 44 which have voltage selectively applied thereto from a control means (not shown) for controlling whether or not charge is applied to droplets within the respective slots in the charge electrode assembly 32. The ink droplets formed from the streams 20, 24 and 26 then pass through deflection means comprised of deflection electrodes 44 and 46, with the deflection electrode 44 being connected to ground and having a droplet catcher 48 formed on one end thereof with a conduit 50 returning guttered droplets to an ink reservoir (not shown). The deflection electrode 46 is connected to a source of positive voltage (VD) for causing charged droplets to be deflected to the gutter 48, with uncharged droplets being undeflected and following a path whereby they strike a printing medium, such as a paper 52, which is travelling in the direction of an arrow 54. Refer to FIG. 2 which illustrates how acoustic fibers may be attached to a nozzle plate. As shown in FIG. 2A, a nozzle plate 56, which for example, may be formed in a semiconductor substrate such as silicon has a plurality of nozzles 58, 60, 62 and 64 formed therein utilizing etching techniques similar to those set forth in referenced U.S. Pat. No. 3,921,916 and patent application Ser. No. 543,600. In FIG. 2B, grooves 66, 68, 70, and 72 are etched in the substrate to a depth of approximately 3 or 4 mils deep and a diameter on the order of 12 mils utilizing known techniques similar to those set forth in the above referenced application and patent. The grooves are alternated above and below each of the nozzles for ease of spacing, rather than all being below the nozzles as illustrated in FIG. 1.

FIG. 2C illustrates the nozzle plate 56 mounted on a manifold 74 which includes spacers 76 and 78. The manifold 74 for example, may be made of steel. Grooves 80, 82, 84 and 86 are machined in the manifold 74 in alignment with the etched grooves 66, 68, 70 and 72, respectively, of the nozzle plate 56. Elastomeric spacers 88 and 90 are spaced $\lambda/4$ increments from the end of the fiber, illustrated in FIG. 2D, to provide acoustic isolation at the perturbation frequency, where $\lambda$ is the acoustic perturbation frequency.

FIG. 3 is a cross sectional view of the manifold 74 which more clearly illustrates the relation of the grooves relative thereto, and to the nozzle plate 56.

FIG. 2D illustrates acoustic fibers 92, 94, 96 and 98, having a diameter on the order of 10 mils, mounted within but isolated from the respective grooves by the elastomeric members. As previously stated the elastomeric members provide acoustic isolation, and may be comprised of 0 rings, grommets or may be formed from a bead of liquid rubber substance to which the acoustic fibers are attached, and with the hardening of the rubber, the hardened rubber bead serves as a support as well as an acoustic isolation means.

FIG. 4 is a cross sectional view of the manifold 74 illustrating how the fiber 96 is situated adjacent the nozzle 62, but is not in contact with the nozzle plate 56 or the manifold 74 due to the spacing of the elastomeric members 88 and 90. Accordingly, the ink jet head is acoustically isolated from the acoustic energy source, thereby preventing resonance of the ink jet head.

Figure 5A:
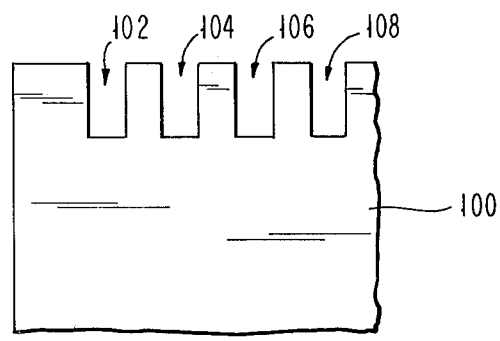
FIGS. 5A–5C are sequential views illustrating how acoustic fibers are mounted on a charge electrode assembly.
Figure 5B:
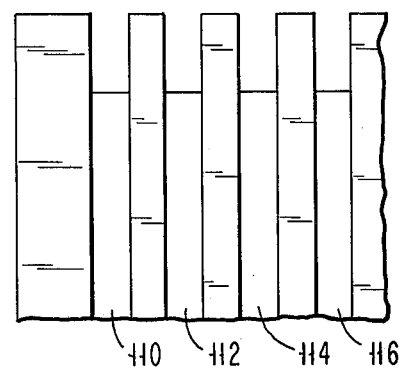
Figure 5C:
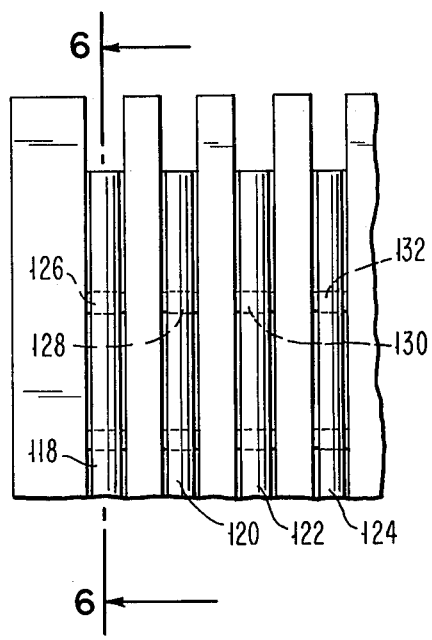

The acoustic excitation of the respective ink jet streams may also be accomplished by mounting the acoustic fibers on the face of the charge electrode structure facing the nozzle plate. Accordingly, the ink jet streams are acoustically excited before entering the charge electrode structure, and then break up to form droplets within the charge electrode structure in response to the excitation. Refer to FIGS. 5A-5C which illustrate how the acoustic fibers may be mounted on a representative charge electrode assembly. In FIG. 5A a substrate, which for example may be formed of aluminum oxide ($Al_2O_3$), has a plurality of slots 102, 104, 106 and 108 machined therein. Next as illustrated in FIG. 5B, grooves 110, 112, 114 and 116 are machined in the substrate, and the substrate is fired to form a charge electrode structure. Next, as illustrated in FIG. 5C, acoustic fibers 118, 120, 122 and 124 are mounted within the respective slots, but isolated therefrom by elastomeric members 126, 128, 130 and 132, respectively.

Figure 6:
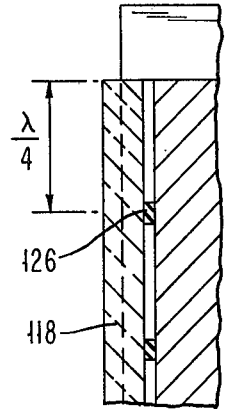
FIG. 6 is a cross sectional view taken along the lines 6—6 of FIG. 5C.

FIG. 6 is a cross-section taken along the line 6—6 of FIG. 5C which illustrates how the fiber 118 is situated in the groove 110. Again the elastomeric members are situated $\lambda/4$ increments away from the end of the fiber to provide acoustic isolation. Alternatively, the charge electrode structure could be made from a semiconductor substrate as set forth in referenced U.S. Pat. No. 3,984,843, with grooves being etched therein utilizing techniques similar to those described for etching grooves in the nozzle plate as shown in FIGS. 2A-2D.

Figure 7:
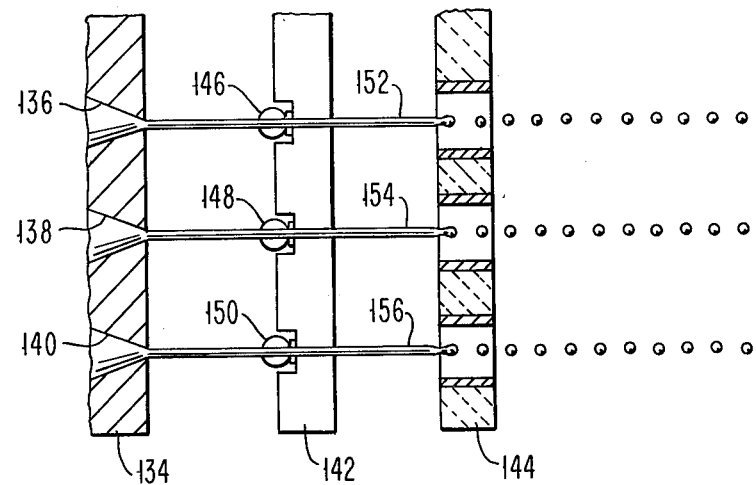
FIG. 7 is a top view, taken partially in cross-section, of an ink jet system in which the acoustic synchronization means is mounted on a substrate situated intermediate the nozzle plate and the charge electrode assembly.

FIG. 7 illustrates another method of acoustically exciting an ink jet stream for synchronizing the formation of droplets from one stream to the next. A nozzle plate 134 has nozzles 136, 138 and 130 formed therein, with a support assembly 142 being situated intermediate the nozzle plate 134 and a charge electrode assembly 144. The support assembly 142 has acoustic fibers 146, 148 and 150 mounted thereon, substantially perpendicular to the respective central axis of each stream, for acoustically exciting ink jet streams 152, 154 and 156 as they pass thereabove, such that droplets are formed in synchronization within the charge electrode structure 144.

Figure 8A:
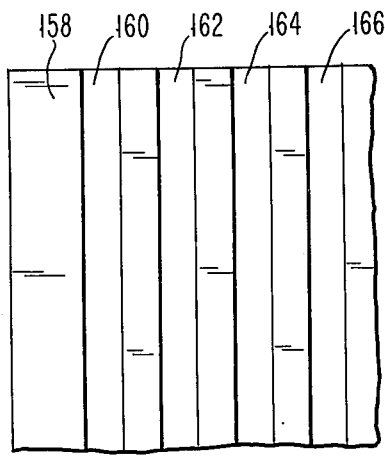
FIGS. 8A and 8B are sequential views illustrating how grooves are formed in a substrate, as illustrated in FIG. 7, for mounting acoustic fibers thereon.
Figure 8B:
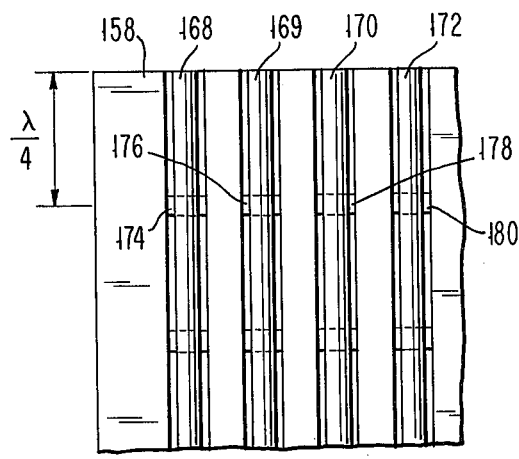

FIGS. 8A and 8B illustrate how a support assembly 158 has acoustic fibers mounted thereon to provide acoustic excitation as illustrated in FIG. 7. The support member 158, which may be a machinable glass ceramic or fiber board, has grooves 160, 162, 164 and 166 machined therein, with fibers 168, 169, 170 and 172 being mounted within, but isolated from the respective grooves, as illustrated in FIG. 8B, by elastomeric members 174, 176, 178 and 180, respectively. Again, the elastomeric members are placed $\lambda/4$ from the end of the fiber, and so on for the height of the assembly.

The acoustic synchronization of ink jet streams emanating from an ink jet array may be accomplished by any of the above-described acoustic mounting methods, thereby eliminating the acoustic vibration and resonance of the ink jet head.

What is claimed is:

1. In an ink jet system, the combination comprising:
an ink source;
means for emitting a plurality of streams of ink from said source;
a plurality of acoustic fibers, with a different one of said plurality of acoustic fibers being coupled to each of said plurality of streams at a position displaced from where each of said plurality of streams is emitted from said source; and
means for acoustically energizing each of said plurality of fibers for acoustically exciting each of said plurality of streams for synchronizing the droplet formation from one stream to the next.

2. The combination claimed in claim 1, wherein said means for acoustically energizing comprises at least one source of acoustic energy.

3. In an ink jet printing system, the combination comprising:

an ink manifold, including a supply of ink;

an ink jet head, including a plurality of nozzles therein, with said head being secured to said manifold such that a plurality of ink jet streams are emitted from said plurality of nozzles;

a plurality of charge electrode structures, with a different one of said plurality of ink jet streams passing through each of the respective charge electrode structures, for either receiving or not receiving charge in accordance with a pedetermined charging sequence;

a deflection means through which each of said plurality of streams passes, with a given droplet in a stream either being deflected or not being deflected to a printing medium in accordance with whether or not it has a charge thereon; and means for acoustically exciting each individual one of said ink jet streams at a position displaced from where each of said ink jet streams is emitted from the respective ones of said plurality of nozzles, for synchronizing the droplet formation from one stream to the next.

4. The combination claimed in claim 3, wherein said means for acoustically exciting comprises a plurality of acoustic fibers, with a different one of said plurality of acoustic fibers being coupled to each of said plurality of streams at a position displaced from where each of said ink jet streams is emitted from the respective ones of said plurality of nozzles.

5. The combination claimed in claim 4, wherein each of said acoustic fibers is attached to a different one of said charge electrode structures.

6. The combination claimed in claim 4, including: a substrate situated intermediate said ink jet head and said plurality of charge electrode structures, said substrate having a plurality of passages therein, there being a number of passages at least equal to the number of nozzles, with each passage being in axial alignment with a given one of said nozzles and a given one of said charge electrode structures, such that the ink stream emitted from said one nozzle passes therethrough, within a different one of said acoustic fibers being attached adjacent each of said passages for acoustically exciting the stream passing therethrough.

7. The combination claimed in claim 4, wherein a groove is formed adjacent each nozzle in said ink jet head, with a different one of said plurality of acoustic fibers being bonded in each groove.

8. The combination claimed in claim 7, including acoustic isolation means being formed in each groove to isolate the acoustic fiber from the ink jet head.

* * * * *